US00RE47466E

(19) United States
(12) Reissued Patent
Fischer et al.

(10) Patent Number: US RE47,466 E
(45) Date of Reissued Patent: *Jun. 25, 2019

(54) SYSTEMS AND METHODS FOR IP COMMUNICATION OVER A DISTRIBUTED ANTENNA SYSTEM TRANSPORT

(71) Applicant: CommScope Technologies LLC, Hickory, NC (US)

(72) Inventors: Larry G. Fischer, Waseca, MN (US); Jeffrey J. Cannon, Victoria, MN (US); Steven B. Stuart, Eden Prairie, MN (US); John M. Hedin, Coon Rapids, MN (US)

(73) Assignee: CommScope Technologies LLC, Hickory, NC (US)

( * ) Notice: This patent is subject to a terminal disclaimer.

(21) Appl. No.: 15/436,534

(22) Filed: Feb. 17, 2017

Related U.S. Patent Documents

Reissue of:
(64) Patent No.: 8,958,410
Issued: Feb. 17, 2015
Appl. No.: 13/529,607
Filed: Jun. 21, 2012

U.S. Applications:
(63) Continuation of application No. 12/555,912, filed on Sep. 9, 2009, now Pat. No. 8,213,401.
(Continued)

(51) Int. Cl.
*H04W 88/08* (2009.01)

(52) U.S. Cl.
CPC ..... *H04W 88/085* (2013.01)

(58) Field of Classification Search
CPC ..... H04W 88/085; H04W 24/00; H04W 4/20
(Continued)

(56) References Cited

U.S. PATENT DOCUMENTS 4,183,054 A 1/1980 Patisaul et al.
4,611,323 A 9/1986 Hessenmuller
(Continued)

FOREIGN PATENT DOCUMENTS

CN 1844948 10/2006
CN 101123758 A 2/2008
(Continued)

OTHER PUBLICATIONS

State Intellectual Property Office, P.R. China, "First Office Action from CN Application No. 201080004462.0", "from Foreign Counterpart of U.S. Appl. No. 12/555,923", dated Jul. 12, 2013, pp. 1-17, Published in: CN.

(Continued)

*Primary Examiner* — Mark Sager
(74) *Attorney, Agent, or Firm* — Fogg & Powers LLC

(57) ABSTRACT

Systems and methods for IP communication over a distributed antenna system transport are provided. In one embodiment, a method for providing Ethernet connectivity over a distributed antenna system comprises receiving internet protocol (IP) formatted data from an internet protocol device coupled to a remote unit of a distributed antenna system; sampling wireless radio frequency (RF) signals received at the remote unit to produce digitized RF samples; generating a serial data stream for output to a host unit of the distributed antenna system, the serial data stream further comprising a multiple-timeslot communication frame providing a first partition of bandwidth for transporting the digitized RF samples and a second partition of bandwidth for implementing an Ethernet pipe for transporting the IP formatted data.

20 Claims, 5 Drawing Sheets

Related U.S. Application Data

(60) Provisional application No. 61/144,255, filed on Jan. 13, 2009.

(58) Field of Classification Search
USPC ..... 370/310
See application file for complete search history.

(56) References Cited

U.S. PATENT DOCUMENTS

| | | | | |
|---|---|---|---|---|
| 4,628,501 | A | 12/1986 | Loscoe | |
| 4,654,843 | A | 3/1987 | Roza et al. | |
| 4,691,292 | A | 9/1987 | Rothweiler | |
| 4,999,831 | A | 3/1991 | Grace | |
| 5,193,109 | A | 3/1993 | Chien-Yeh Lee | |
| 5,243,598 | A | 9/1993 | Lee | |
| 5,321,849 | A | 6/1994 | Lemson | |
| 5,339,184 | A | 8/1994 | Tang | |
| 5,627,879 | A | 5/1997 | Russell et al. | |
| 6,603,976 | B1 | 8/2003 | Amirijoo et al. | H04W 64/00 342/357.4 |
| 6,704,545 | B1 | 3/2004 | Wala | |
| 6,831,901 | B2 | 12/2004 | Millar | |
| 6,963,552 | B2 | 11/2005 | Sabat, Jr. et al. | |
| 7,024,155 | B2 * | 4/2006 | Gosieski, Jr. | 455/3.01 |
| 7,039,399 | B2 | 5/2006 | Fischer | |
| 7,103,377 | B2 | 9/2006 | Bauman et al. | |
| 7,171,244 | B2 | 1/2007 | Bauman | |
| 7,224,170 | B2 | 5/2007 | Graham et al. | |
| 7,286,507 | B1 | 10/2007 | Oh | |
| 7,336,961 | B1 | 2/2008 | Ngan | |
| 7,583,929 | B2 | 9/2009 | Choi et al. | |
| 7,668,153 | B2 | 2/2010 | Zavadsky | |
| 7,948,897 | B2 | 5/2011 | Stuart et al. | |
| 7,962,174 | B2 * | 6/2011 | Lipowski et al. | 455/561 |
| 8,005,152 | B2 | 8/2011 | Wegener | |
| 8,204,543 | B2 * | 6/2012 | Keevill et al. | 455/561 |
| 8,213,401 | B2 | 7/2012 | Fischer et al. | |
| 8,315,648 | B2 * | 11/2012 | Carlson et al. | 455/456.1 |
| 8,346,278 | B2 * | 1/2013 | Wala | G01S 5/0054 455/456.1 |
| 8,359,409 | B2 * | 1/2013 | Raju et al. | 710/15 |
| 8,489,089 | B1 * | 7/2013 | Norman et al. | 455/424 |
| 8,514,800 | B2 * | 8/2013 | Kim et al. | 370/329 |
| 8,526,970 | B2 * | 9/2013 | Wala | H04W 64/00 455/456.2 |
| 8,958,410 | B2 | 2/2015 | Fischer et al. | |
| 2004/0106435 | A1 | 6/2004 | Bauman et al. | |
| 2004/0198386 | A1 | 10/2004 | Dupray | |
| 2005/0153712 | A1 | 7/2005 | Osaka et al. | |
| 2005/0186937 | A1 | 8/2005 | Graham | |
| 2006/0172775 | A1 | 8/2006 | Conyers et al. | |
| 2007/0008939 | A1 | 1/2007 | Fischer | |
| 2008/0014948 | A1 | 1/2008 | Scheinert | |
| 2008/0058018 | A1 | 3/2008 | Scheinert | |
| 2008/0151846 | A1 | 6/2008 | Scheinert et al. | |
| 2008/0181171 | A1 | 7/2008 | Koziy et al. | H04W 88/085 370/328 |
| 2008/0181282 | A1 | 7/2008 | Wala et al. | |
| 2008/0232328 | A1 | 9/2008 | Scheinert et al. | |
| 2008/0267142 | A1 | 10/2008 | Mushkin et al. | H01Q 1/2291 370/338 |
| 2009/0005096 | A1 | 1/2009 | Scheinert | |
| 2009/0061940 | A1 | 3/2009 | Scheinert et al. | |
| 2009/0092142 | A1 | 4/2009 | Kreiner et al. | |
| 2010/0177759 | A1 | 7/2010 | Fischer et al. | |
| 2010/0178936 | A1 | 7/2010 | Wala et al. | |
| 2011/0270978 | A1 * | 11/2011 | Norman et al. | 709/224 |
| 2013/0079035 | A1 | 3/2013 | Wala et al. | |

FOREIGN PATENT DOCUMENTS

| | | |
|---|---|---|
| EP | 0391597 | 10/1990 |
| WO | 9115927 | 10/1991 |
| WO | 03065757 | 8/2003 |

OTHER PUBLICATIONS

U.S. Patent and Trademark Office, "Notice of Allowance", "U.S. Appl. No. 12/555,912", dated Apr. 2, 2012, pp. 1-8.
U.S. Patent and Trademark Office, "Notice of Allowance", "U.S. Appl. No. 12/555,912", dated May 11, 2012, pp. 1-12.
United States Patent and Trademark Office, "Notice of Allowance", "from U.S. Appl. No. 13/529,607", dated Oct. 2, 2014, pp. 1-16, Published in: US.
United States Patent and Trademark Office, "Office Action", "from U.S. Appl. No. 13/529,607", dated Apr. 18, 2014, pp. 1-46, Published in: US.
United States Patent and Trademark Office, "Office Action", "from U.S. Appl. No. 13/529,607", Jun. 25, 2014, pp. 1-47, Published in: US.
Australian Government IP Australia, "Patent Examination Report No. 1 from AU Application No. 2010204891 dated Nov. 12, 2014", from Foreign Counterpart of U.S. Appl. No. 12/555,912, filed Nov. 12, 2014, pp. 1-3, Published: AU.
European Patent Office, "Communication pursuant to Article 94(3) from EP Application No. 10731977.A dated Apr. 22, 2015", from Foreign Counterpart of U.S. Appl. No. 12/555,912, filed Apr. 22, 2015, pp. 1-4, Published: EP.
U.S. Patent and Trademark Office, "Office Action", U.S. Appl. No. 12/555,912, dated Feb. 2, 2012, pp. 1-32, Published: US.
State Intellectual Property Office, P.R. China, "Second Office Action from CN Application No. 201080004462.0 dated Jan. 23, 2014", "from Foreign Counterpart of U.S. Appl. No. 12/555,923", filed Jan. 23, 2014, pp. 1-12, Published in: CN.
State Intellectual Property Office, P.R. China, "Office Action from CN Application No. 201080004462.0 dated Jun. 3, 2014", "from Foreign Counterpart of U.S. Appl. No. 12/555,923", filed Jun. 3, 2014, pp. 1-12, Published in: CN.
State Intellectual Property Office Peoples Republic of China, "Third Office Action for CN Aplication No. 201080004462.0", "from Foreign Counterpart of U.S. Appl. No. 12/555,923", dated Jan. 9, 2015, pp. 1-6, Published in: CN.
European Patent Office, "Extended European Search Report for Application No. 10731977.4", "for Foreign counterpart of U.S. Appl. No. 12/555,923", dated Aug. 28, 2014, pp. 1-10, Published in: EP.
U.S. Patent and Trademark Office, "Notice of Allowance", "U.S. Appl. No. 12/555,923", dated Aug. 24, 2012, pp. 1-13.
U.S. Patent and Trademark Office, "Office Action", "U.S. Appl. No. 12/555,923", dated Mar. 29, 2012, pp. 1-32.
U.S. Patent and Trademark Office, "Notice of Allowance", "U.S. Appl. No. 13/681,535", dated Jun. 28, 2013, pp. 1-10.
U.S. Patent and Trademark Office, "Office Action", "U.S. Appl. No. 13/681,535", dated May 9, 2013, pp. 1-16.
U.S. Patent and Trademark Office, "Restriction Requirement", "U.S. Appl. No. 13/681,535", dated Apr. 18, 2013, pp. 1-6.
International Searching Authority, "International Search Report and Written Opinion", "from Foreign Counterpart of U.S. Appl. No. 12/555,923", dated Jul. 29, 2010, pp. 1-10, Published in: WO.
European Patent Office, "Office Action from EP Application No. 10731977.4 dated Mar. 14, 2018", "from Foreign Counterpart of U.S. Appl. No. 12/555,912", Mar. 14, 2018, p. 1 - 6, Published in: EP.
U.S. Patent and Trademark Office, "Restriction Requirement", "U.S. Appl. No. 13/681,535", Apr. 18, 2013, pp. 1-6.
U.S. Patent and Trademark Office, "Office Action", "U.S. Appl. No. 13/681,535", May 9, 2013, pp. 1-16.
U.S. Patent and Trademark Office, "Notice of Allowance", "U.S. Appl. No. 13/681,535", Jun. 28, 2013, pp. 1-10.
U.S. Patent and Trademark Office, "Notice of Allowance", "U.S. Appl. No. 12/555,923", Aug. 24, 2012, pp. 1-13.
U.S. Patent and Trademark Office, "Office Action", "U.S. Appl. No. 12/555,923", Mar. 29, 2012, pp. 1-32.
U.S. Patent and Trademark Office, "Supplemental Notice of Allowance", "U.S. Appl. No. 12/555,923", Sep. 26, 2012, pp. 1-6.

(56) References Cited

OTHER PUBLICATIONS

"CPRI Specification V1.4, Common Public Radio Interface; Interface Specification", Mar. 31, 2006, pp. 1-64, Publisher: Ericsson AB, Huawei Technologies Co. Ltd, NEC Corporation, Nortel Networks SA and Siemens AG.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", Jun. 1991, pp. 1171-1175, Publisher: IEEE.
Wala et al., "U.S. Appl. No. 12/555,923, Systems and Methods for Mobile Phone Location With Digital Distributed Anenna Systems", filed Sep. 9, 2009, pp. 25 pgs.

* cited by examiner

SYSTEMS AND METHODS FOR IP COMMUNICATION OVER A DISTRIBUTED ANTENNA SYSTEM TRANSPORT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED CASES

*This Reissue Application is a reissue of application Ser. No. 13/529,607, filed Jun. 21, 2012, which issued as U.S. Pat. No. 8,958,410.* This application is continuation of U.S. application Ser. No. 12/555,912 filed on Sep. 9, 2009 and entitled "SYSTEMS AND METHODS FOR IP COMMUNICATION OVER A DISTRIBUTED ANTENNA SYSTEM TRANSPORT," which, in turn, claims the benefit of U.S. Provisional Application No. 61/144,255 filed on Jan. 13, 2009 both of which are incorporated herein by reference in their entirety.

This application is related to U.S. Provisional Application No. 61/144,257 filed on Jan. 13, 2009 entitled "SYSTEMS AND METHODS FOR MOBILE PHONE LOCATION WITH DIGITAL DISTRIBUTED ANTENNA SYSTEMS," and which is incorporated herein by reference in its entirety.

This application is related to U.S. patent application Ser. No. 12/555,923 filed on Sep. 9, 2009 entitled "SYSTEMS AND METHODS FOR MOBILE PHONE LOCATION WITH DIGITAL DISTRIBUTED ANTENNA SYSTEMS," and which is incorporated herein by reference in its entirety.

BACKGROUND

A Distributed Antenna System, or DAS, is a network of spatially separated antenna nodes connected to a common node via a transport medium that provides wireless service within a geographic area or structure. Common wireless communication system configurations employ a host unit as the common node, which is located at a centralized location (for example, at a facility that is controlled by a wireless service provider). The antenna nodes and related broadcasting and receiving equipment, located at a location that is remote from the host unit (for example, at a facility or site that is not controlled by the wireless service provider), are also referred to as "remote units." Radio frequency (RF) signals are communicated between the host unit and one or more remote units. In such a DAS, the host unit is typically communicatively coupled to one or more base stations (for example, via wired connection or via wireless connection) which allow bidirectional communications between wireless subscriber units within the DAS service area and communication networks such as, but not limited to, cellular phone networks, the public switch telephone network (PSTN) and the Internet. A DAS can thus provide, by its nature, an infrastructure within a community that can scatter remote units across a geographic area thus providing wireless services across that area.

For the reasons stated above and for other reasons stated below which will become apparent to those skilled in the art upon reading and understanding the specification, there is a need in the art for systems and methods for facilitation of supplemental data communication over a distributed antenna system transport.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide point-to-point Ethernet connections (100 Base-T, for example) between elements of a distributed antenna system by adapting the digital radio frequency (RF) transport medium to further carry internet protocol data traffic simultaneously with the RF traffic. Embodiments of the present invention enable installation of internet protocol devices at remote locations (for example, to extend a Local Area Network (LAN)/IP network into remote areas, or establish various services at remote locations that benefit from having IP network connectivity). Internet protocol devices may thus include networking devices such as switches, routers, and wireless access points (for WiFi, WiMAX, LTE, for example) or cameras, sensors, audio and/or video devices for security, distributing announcements, warnings or advertising. In one embodiment, the Internet Protocol device is a mobile phone locator such as described in the '1075 Application herein incorporated by reference. One of ordinary skill in the art after reading this specification would thus realize that such internet connectivity allows utilization of the remote facilities of a distributed antenna system to provide functions beyond that related to the principal RF functions of the system.

Figure 1:
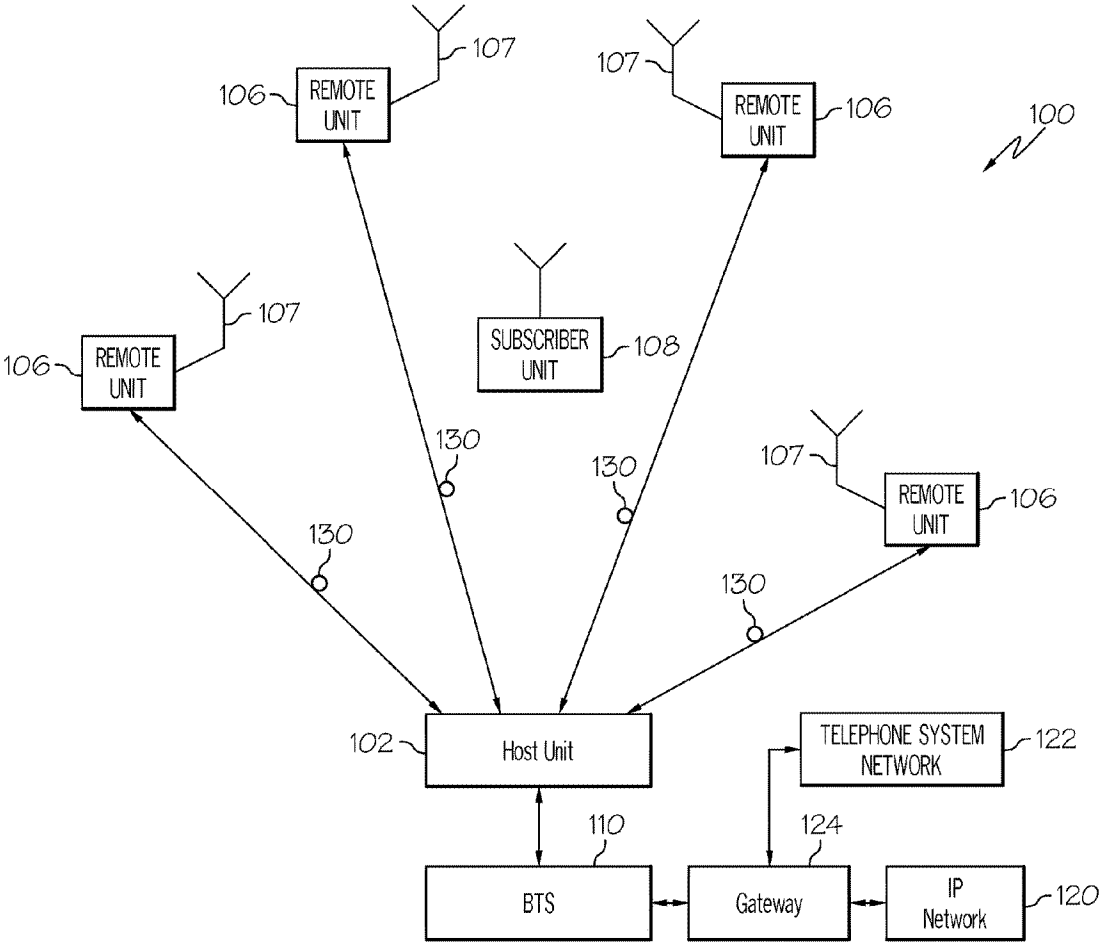
FIG. 1 is a block diagram of a distributed antenna system (DAS) of one embodiment of the present invention.

FIG. 1 is a block diagram of a distributed antenna system (DAS) 100 of one embodiment of the present invention. DAS 100 includes a host unit 102 and a plurality of remote units 106. At the physical layer, host units 102 and remote units 106 are interconnected via fiber optic cable as indicated in FIG. 1 to form a bidirectional communication link network comprising a plurality of point-to-point communication links shown at 130. Optionally, host units 102 and remote units 106 may be interconnected via coaxial cable, or a combination of both coaxial cable and fiber optic cable. Further, host units 102 and remote units 106 may be interconnected via wireless technology such as, but not limited to, microwave and e-band communication.

Remote units 106 each house electronic devices and systems used for wirelessly transmitting and receiving modulated radio frequency (RF) communications via antenna 107 with one or more mobile subscriber units 108. Host unit 102 is coupled to at least one base transceiver station (BTS) 110 often referred to as a base station. BTS 110 communicates voice and other data signals between the respective host unit 102 and a larger communication network via a gateway 124 coupled to a telephone system network 122 (for example, the public switched telephone network and/or wireless service provider networks) and an internet protocol (IP) network 124, such as the Internet. In one embodiment, DAS 100 comprises part of a cellular telephone network and subscriber units 108 are cellular telephones.

Downlink RF signals are received from the BTS 110 at the host unit 102, which the host unit 102 uses to generate one or more downlink transport signals for transmitting to one or more of the remote units 106. Each such remote unit 106 receives at least one downlink transport signal and reconstructs the downlink RF signals from the downlink transport signal and causes the reconstructed downlink RF signals to be radiated from a remote antenna 107 coupled to or included in that remote unit 106. A similar process is performed in the uplink direction. Uplink RF signals received at one or more remote units 106 from subscriber 108 are used to generate respective uplink transport signals that are transmitted from the respective remote units 106 to the host unit 102. The host unit 102 receives and combines the uplink transport signals transmitted from the multiple remote units 106. The host unit 102 communicates the combined uplink RF signals to the BTS 110 over a broadband medium.

DAS 100 comprises a digital DAS transport meaning that the downlink and uplink transport signals transmitted between host unit 102 and remote units 106 over communication links 130 are generated by digitizing the downlink and uplink RF signals, respectively. In other words, the downlink and uplink transport signals are not analog RF signals but instead are digital data signals representing digital RF samples of a modulated RF signal. For example, if a particular communication signal destined for transmission to subscriber unit 108 is a modulated RF signal in the 900 MHz band, then host unit 102 will generate baseband digital samples of the modulated 900 MHz RF signal from BTS 110, which are then distributed by host unit 102 to the remote units 106. Alternatively, an all-digital BTS may generate baseband digital samples directly. At the remote units, the digital samples of the modulated RF signal are converted from digital into an analog RF signal to be wirelessly radiated from the antennas 107. In the uplink analog RF signals received at remote unit 106 are sampled to generate RF data samples for the uplink transport signals. BTS 110, host unit 102 and remote units 106 each accommodate processing communication signals for multiple bands and multiple modulate schemes simultaneously. In addition to communicating the downlink and uplink transport RF signals, the digital transport between host unit 102 and each remote units 106 includes sufficient bandwidth (that is, in excess of what is necessary to transport the digitized RF data samples) to implement an Ethernet pipe (100 Base-T) between each remote unit 106 and the host unit 102 for facilitating supplemental Internet Protocol formatted data communications. In one embodiment, the Ethernet pipe provides a bandwidth of at least 100M bits/sec.

It is understood in the art that RF signals are often transported at intermediate frequencies (IF) or baseband. Therefore, within the context of this application, the terms "digital RF", "digitized RF data", "digital RF signal", "digital RF samples", "digitized RF samples" and "digitized RF signals" are understood to include signals converted to IF and baseband frequencies.

Figure 2:
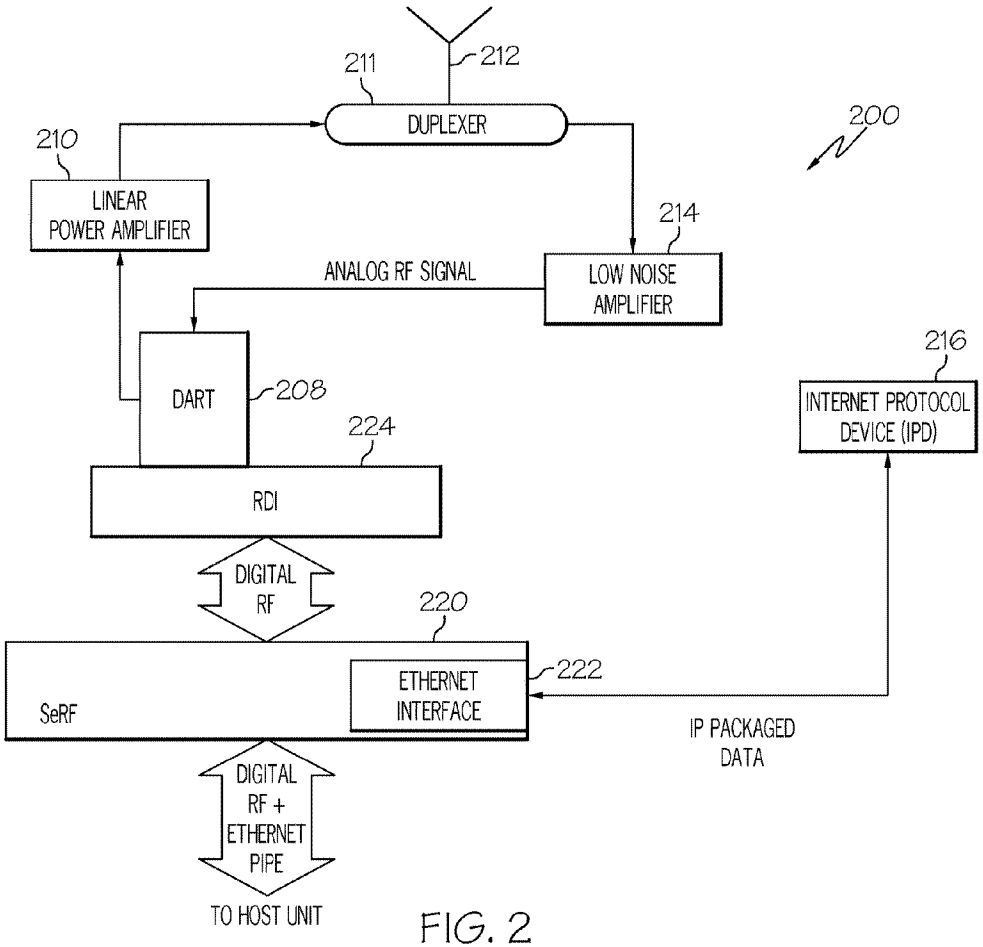
FIG. 2 is a block diagram of a remote unit of one embodiment of the present invention.

FIG. 2 is a block diagram of a remote unit 200 of one embodiment of the present invention such as the remote units 106 discussed with respect to FIG. 1. Remote unit 200 includes a serial radio frequency (SeRF) module 220, a digital to analog radio frequency transceiver (DART) module 208, a remote DART interface board (RDI) 224, a linear power amplifier 210, antenna 212, a duplexer 211, a low noise amplifier 214 and an Internet Protocol device (IPD) 216. In one embodiment, SeRF modules and DART modules and Internet Protocol (IP) devices described herein are realized using discrete RF components, FPGAs, ASICs, digital signal processing (DSP) boards, or similar devices.

DART module 208 provides bi-directional conversion between analog RF signals and digital sampled RF for the downlink and uplink transport signals transmitted between host unit 102 and remote units 106. In the uplink, DART module 208 receives an incoming analog RF signal from subscriber unit 108 and samples the analog RF signal to generate a digital data signal for use by SeRF module 220. Antenna 212 receives the wireless RF signal from subscriber 108 which passes the RF signal to DART module 208 via low noise amplifier 214. In the downlink direction DART module 208 receives digital sampled RF data from SeRF module 220, up converts the sampled RF data to a broadcast frequency, and converts the digital RF samples to analog RF for wireless transmission. After a signal is converted to an analog RF signal by DART module 208, the analog RF signal is sent to linear power amplifier 210 for broadcast via antenna 212. Linear power amplifier 210 amplifies the RF signal received from DART module 208 for output through duplexer 211 to antenna 212. Duplexer 211 provides duplexing of the signal which is necessary to connect transmit and receive signals to a common antenna 212. In one embodiment, low noise amplifier 214 is integrated into duplexer 211. One of ordinary skill in the art upon reading this specification would appreciate that DART modules may function to optionally convert the digital RF samples into intermediate frequency (IF) samples instead of, or in addition to, baseband digital samples.

DART modules in a remote unit are specific for a particular frequency band. A single DART module operates over a defined band regardless of the modulation technology being used. Thus frequency band adjustments in a remote unit can be made by replacing a DART module covering one frequency band with a DART module covering a different frequency band. For example, in one implementation DART module 208 is designed to transmit 850 MHz cellular transmissions. As another example, in another implementation DART module 208 transmits 1900 MHz PCS signals. Some of the other options for a DART module 208 include, but are not limited to, Nextel 800 band, Nextel 900 band, PCS full band, PCS half band, BRS, WiMax, Long Term Evolution (LTE), and the European GSM 900, GSM 1800, and UMTS 2100. By allowing different varieties of DART modules 208 to be plugged into RDI 224, remote unit 200 is configurable to any of the above frequency bands and technologies as well as any new technologies or frequency bands that are developed. Also, a single remote unit may be configured to operate over multiple bands by possessing multiple DART modules. The present discussion applies to such multiple band remote units, even though the present examples focuses on a the operation of a single DART module for simplicity.

SeRF module 220 is coupled to RDI 224. RDI 224 has a plurality of connectors each of which is configured to receive a pluggable DART module 208 and connect DART module 208 to SeRF module 220. RDI 224 is a common interface that is configured to allow communication between SeRF module 220 and different varieties of DART modules 208. In this embodiment, RDI 204 is a passive host backplane to which SeRF module 220 also connects. In another embodiment, instead of being a host backplane, RDI 224 is integrated with SeRF module 220. When a remote unit operates over multiple bands by possessing multiple DART modules, RDI 224 provides separate connection interfaces allowing each DART module to communicate RF data samples with SeRF module 220. Although FIG. 2 illustrates a single SeRF module connected to a single RDI, embodiments of the present invention are not limited to such. In alternate embodiments, a SeRF module may connect to multiple RDIs, each of which can connect to multiple DARTS. For example, in one embodiment, a SeRF module can connect to up to 3 RDIs, each of which can connect to up to 2 DARTs. SeRF module 220 provides bi-directional conversion between a serial stream of RF, IF or baseband data samples (a SeRF stream) and a high speed optical serial data stream. In the uplink direction, SeRF module 220 receives an incoming SeRF stream from DART modules 208 and sends a serial optical data stream over communication links 130 to host unit 102. In the downlink direction, SeRF module 220 receives an optical serial data stream from host unit 102 and provides a SeRF stream to DART modules 208.

Remote unit 200 further includes an internet protocol device (IPD) 216. IPD 216 is coupled to SeRF module 220 via an interface 222 that provides bidirectional access to a point-to-point Ethernet pipe established between remote unit 200 and the host unit 102 over the serial optical data stream. In one embodiment, interface 222 is a receptacle for a standard 8 Position 8 Contact (8P8C) modular plug and category 5/5e cable.

IPD 216 may include any device designed to network using an Ethernet connection. For example, IPD 216 may comprise a networking devices such a switch, router, and/or wireless access point (for WiFi or WiMAX, for example). In another implementation, IPD 216 is a data collection device such as a weather station collecting weather related data such as, but not limited to, temperature, relative humidity, wind speed and direction, precipitation, and the like. In still other implementations, IPD 216 may include any number of other data collection devices such as a surveillance camera, a motion, heat or vibration sensor or a subscriber unit locator. IPD 216 formats data it collects for transmission over an internet protocol (IP) connection and then outputs the data to the SeRF module 220 via interface 222 which in turn routes data over the Ethernet pipe to the host unit 102. In another implementation, IPD 216 is a data distribution device for distributing announcements, warnings or advertising. As such, IPD 216 may comprise a public announcement load speaker, sirens, or liquid crystal diode (LCD) display. Further IPD may support two way interactive messaging, chat, tele/video conferencing applications, and the like.

Although FIG. 2 (discussed above) illustrates a single DART module coupled to a SeRF module, a single remote unit housing may operate over multiple bands and thus include multiple DART modules. In one such embodiment, the systems illustrated in FIG. 2 would simply be replicated once for each band. In one alternate embodiment, a SeRF module also allows multiple DART modules to operate in parallel to communicate high speed optical serial data streams over a communication link with the host unit. In one such embodiment a SeRF module actively multiplexes the signals from multiple DART modules (each DART module processing a different RF band) such that they are sent simultaneously over a single transport communication link. In one embodiment a SeRF module presents a clock signal to each DART module to which it is coupled to ensure synchronization.

Figure 3:
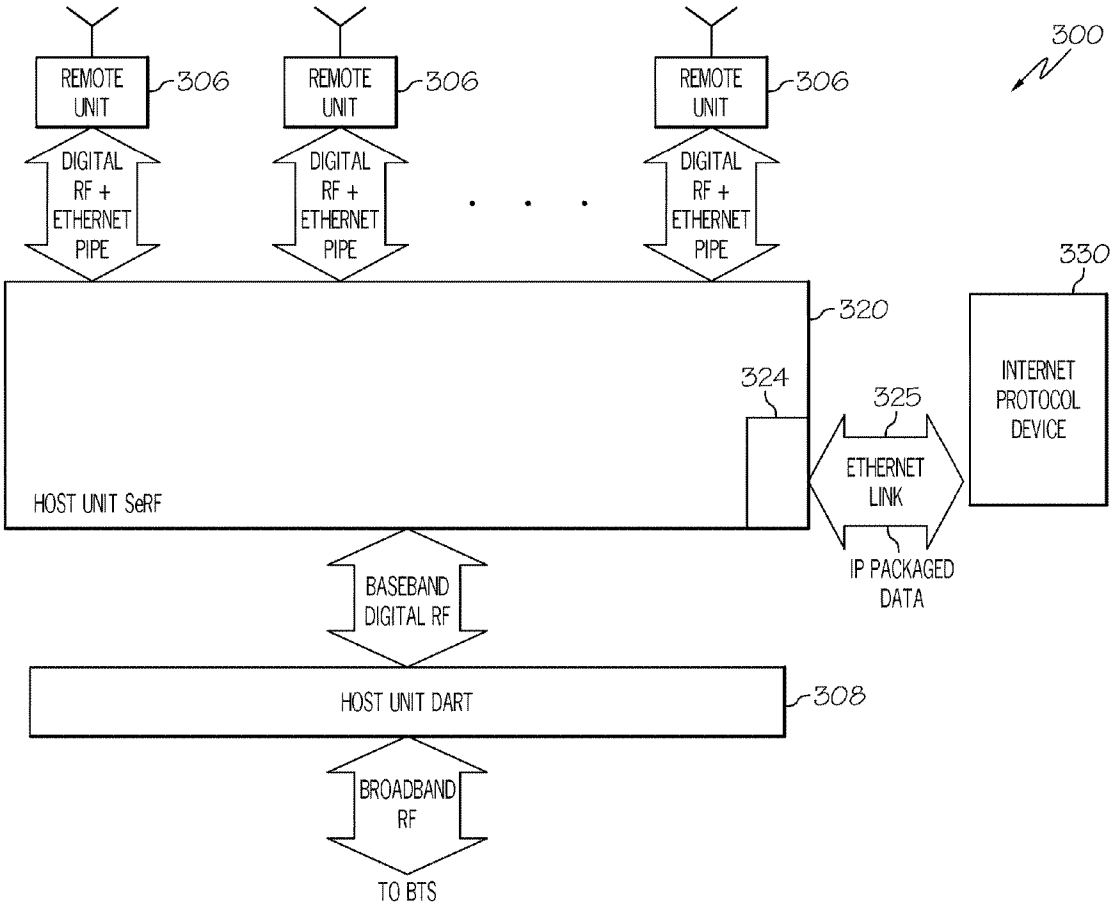
FIG. 3 is a block diagram of a host unit of one embodiment of the present invention.

FIG. 3 is a block diagram illustrating a host unit (shown generally at 300) of one embodiment of the present invention such as the host unit 102 discussed with respect to FIG. 1. Multiple remote units 306 are coupled to host unit 300, as described with respect to FIG. 1, to form a digital DAS. Host unit 300 includes a host unit digital to analog radio frequency transceiver (DART) module 308 and a host unit serial radio frequency (SeRF) module 320. SeRF module 320 provides bi-directional conversion between a serial stream of RF data samples (a SeRF stream) and the multiple high speed optical serial data streams to and from the remote units 306. Each serial optical data stream includes a digital transport for communicating downlink and uplink transport RF signals as well as an Ethernet pipe between each remote unit 306 and host unit 300. In the uplink direction, SeRF module 320 receives incoming serial optical data streams from a plurality of remote units and converts each into a serial stream of digitized baseband RF data samples, which are summed into a broadband stream of RF data samples. DART module 308 provides a bi-directional interface between SeRF module 320 and one or more base stations, such as BTS 110. As with the remote units, when host unit 320 operates over multiple bands with multiple base stations, a separate DART module 308 is provided for each frequency band. In one embodiment, host unit 300 also maintains an Ethernet pipe with at least one base station (such as BTS 110) which provides access to at least one Internet gateway.

Host unit 300 further includes an Ethernet port interface 324 for coupling an Internet Protocol Device (IPD) 330 to SeRF module 320 via an Ethernet link 325. Ethernet link 325 may include a local area network (LAN), wide area network (WAN) having at least one network switch for routing data between interface 324 and IPD 330. Alternatively, IPD 330 may be an internet switch, router, or any of the IP devices discussed above with respect to IPD 216. Ethernet port interface 324 provides access to the Ethernet Pipes established between host unit 300 and one or more of the multiple remote units 306. In one embodiment, a single 8 Position 8 Contact (8P8C) modular plug Ethernet port interface 324 provides access for communication via a virtual Ethernet connection with each multiple remote unit's Ethernet port interface (such as interface 222). In an alternate embodiment, Ethernet port interface 324 provides multiple 8 Position 8 Contact (8P8C) modular plug connection points which each form a point-to-point virtual Ethernet connection with a specific one of the multiple remote units 306.

Referring back to FIG. 2, it can be seen that for upstream communications, IP data received via interface 222 and digitized RF data from DART module 208 are both pushed into SeRF 220 which produces the uplink transport signal that is communicated to the host unit 120 via communication links 130. In doing so, SeRF 220 performs multiplexing in the time domain to route both the IP data and the RF data into time slots within frames communicated to host unit 120. In downstream communications, SeRF 220 de-multiplexes IP data and RF data from within frames received from host unit 120. RF data is routed to the DART module 208 while IP data is routed to Ethernet interface 222. In the host unit 300 illustrated in FIG. 3, the host unit SeRF 320 similarly multiplexes and de-multiplexes IP data and RF data (via communication links 130) to route IP data to and from interface 324 and RF data to and from the host unit DART 308.

Figure 4:
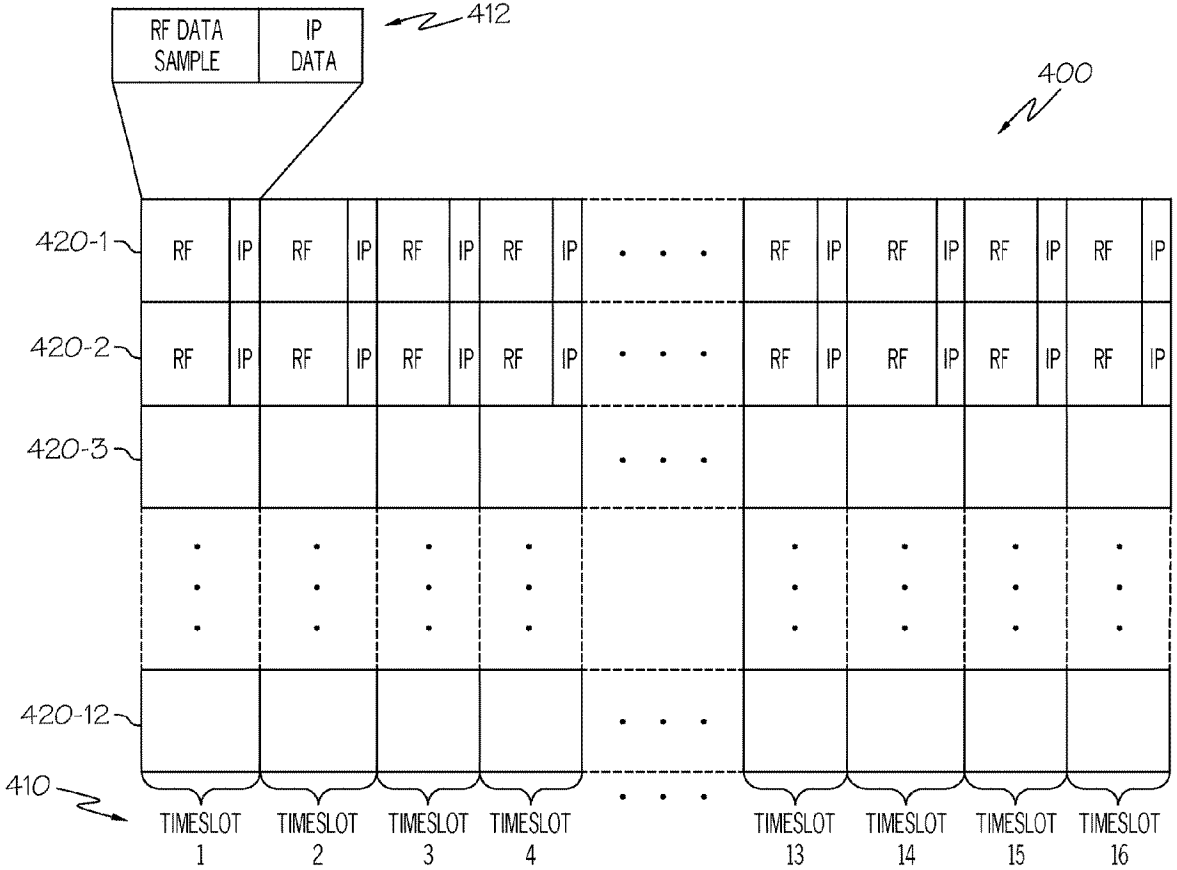
FIG. 4 illustrates a superframe structure of one embodiment of the present invention.

FIG. 4 illustrates one embodiment of a superframe 400, which may be used for either upstream or downstream communications between remote units 106 and host unit 102 via communication links 130. The particular superframe 400 shown comprises 12 frames (shown at 420-1 to 420-12) with each frame divided into 16 timeslots (shown generally at 410). One of ordinary skill in the art upon reading this specification would appreciate that this particular configuration of 12 frames of 16 timeslots is for illustrative purposes only and that embodiments of the present invention may be practiced with superframes having different numbers of frames and timeslots.

In the particular embodiment shown in FIG. 4, each RF data sample carried over the digital transport of the DAS utilizes 15 of 16 available bits within a single timeslot (shown generally at 412, for example). In one embodiment, the SeRF module 220 mulitplexes IP data into the remaining bits of each time slot. That is, for each timeslot carrying RF data, SeRF fills the $16^{th}$ bit with IP data. The SeRF module assembling superframe 400 thus utilizes the remaining overhead in each time slot to transport the IP data along with the RF data sample. In other embodiments, the ratio and/or number of bits used to carry an RF data sample verses the total number of available bits per timeslot may vary. For example, in an alternate embodiment, an RF data sample may utilize 17 of 18 available bits in a timeslot. The SeRF may then fill the $18^{th}$ bit with IP data. In another alternate embodiment, an RF data sample may utilize 15 of 18 available bits in a timeslot. The SeRF may then fill one or all of the $16^{th}$, $17^{th}$, and/or $18^{th}$ bits with IP data.

At the receiving end of the communication link, the SeRF module receiving superframe 400 accordingly separates the IP data from each timeslot to reassemble standard IP data packets. It is not necessary that every timeslot of every frame will carry RF data. In other words, in some implementations, some timeslot of superframe 400 will not be utilized to carry RF data. This may occur where the bandwidth capacity of a particular communication link exceeds the bandwidth demand of a particular remote unit. In those cases, the SeRF module assembling superframe 400 may alternately multiplex IP data onto otherwise unutilized timeslots of superframe 400.

Figure 5:
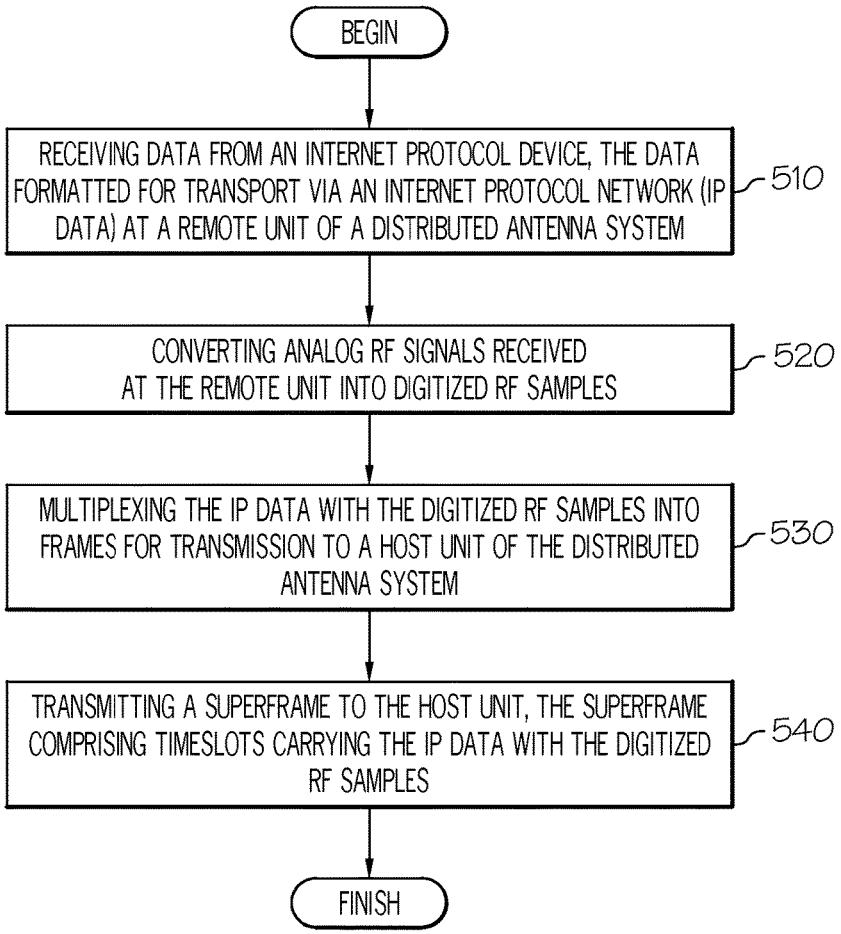
FIG. 5 illustrates a method of one embodiment of the present invention.

FIG. 5 is a flow chart illustrating a method of one embodiment of the present invention. The method begins at 510 with receiving data from an internet protocol device, the data formatted for transport via an internet protocol network (IP data) at a remote unit of a distributed antenna system. The method proceeds to 520 with converting analog RF signals received at the remote unit into digitized RF samples. The method proceeds to 530 with multiplexing the IP data with the digitized RF samples into frames for transmission to a host unit of the distributed antenna system. In one embodiment, multiplexing the IP data with the digitized RF samples into frames is achieved by inserting digitized RF samples into timeslots and then multiplexing the IP data into remaining bits within each time slot. For example, where each RF data sample is 15 bits and each timeslot has a capacity of 16 bits, the method utilizes 15 of 16 available bits within a timeslot to carry the RF data sample and mulitplexes IP data into the remaining $16^{th}$ bits of each timeslot. The method then proceeds to 540 with transmitting a superframe to the host unit, the superframe comprising timeslots carrying the IP data with the digitized RF samples.

Several means are available to implement the systems and methods of the current invention as discussed in this specification. In addition to any means discussed above, these means include, but are not limited to, digital computer systems, microprocessors, programmable controllers, field programmable gate arrays (FPGAs) and application-specific integrated circuits (ASICs). Therefore other embodiments of the present invention are program instructions resident on computer readable media which when implemented by such controllers, enable the controllers to implement embodiments of the present invention. Computer readable media include devices such as any physical form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

We claim:

1. A distributed antenna system, the system comprising:

a host unit;

at least one remote unit for wirelessly communicating with one or more subscriber units, the at least one remote unit *communicatively* coupled to the host unit [over a point-to-point communication link], wherein the at least one remote unit receives uplink radio frequency signals from the one or more subscriber units and [samples the] *generates sample data from the* uplink radio frequency signals [to generate digitized radio frequency signals], the at least one remote unit further comprising an Ethernet interface [for receiving] *to receive* Internet Protocol formatted data; and an internet protocol device coupled to the Ethernet interface;

wherein the at least one remote unit outputs a serial data stream to the host unit, the serial data stream including [digitized radio frequency signals corresponding to distinct spectral regions of analog radio frequency spectrum] *the sample data* and an Ethernet pipe for transporting the Internet Protocol formatted data received via the Ethernet interface;

wherein the serial data stream comprises a multiple-timeslot communication frame, the [digitized radio frequency signals] *sample data* including first bits within a timeslot of the multiple-timeslot communication frame and the Ethernet pipe including second bits within the timeslot.

2. The distributed antenna system of claim 1, wherein the at least one remote unit multiplexes the Internet Protocol formatted data received via the Ethernet interface and the [digitized radio frequency signals] *sample data* into timeslots of the serial data stream.

3. The distributed antenna system of claim 1, the at least one remote unit further comprising:

at least one digital to analog radio frequency transceiver module for generating [a digitized radio frequency signal] *the sample data* from an analog radio frequency signal received from the one or more subscriber units; and a serial data stream module coupled to receive the [digitized radio frequency signal] *sample data* from the at least one digital to analog radio frequency transceiver module, the serial data stream module performing multiplexing in [the] *a* time domain to route both the Internet Protocol formatted data and the [digitized radio frequency signals] *sample data* into time slots within frames communicated to the host unit.

4. The distributed antenna system of claim 3, wherein the [digitized radio frequency signal] *sample data* is a baseband [digital radio frequency] signal.

5. The distributed antenna system of claim 1, wherein the Ethernet interface for receiving the Internet Protocol formatted data comprises an eight-position eight-contact modular plug.

6. The distributed antenna system of claim 1, wherein the Ethernet pipe further comprises at least one timeslot of the multiple-timeslot communication frame that does not carry [digitized radio frequency signal data] *the sample data*.

7. The distributed antenna system of claim 1, the host unit further comprising:

a host serial radio frequency module receiving the serial data stream from the at least one remote unit, wherein the host serial radio frequency module de-multiplexes the [digitized radio frequency data] *sample data* and the Internet Protocol formatted data from the serial data stream and routes the Internet Protocol formatted data to an Ethernet interface at the host unit.

8. The distributed antenna system of claim 1, wherein the at least one remote unit inputs a downlink serial data stream from the host unit, the downlink serial data stream including downlink [digitized radio frequency data samples corresponding to distinct spectral regions of analog radio frequency spectrum] *sample data* and an Ethernet pipe for transporting the downlink Internet Protocol formatted data for output via the Ethernet interface.

9. The distributed antenna system of claim 1, wherein each timeslot of the multiple-timeslot communication frame includes first bits communicating the [digitized radio frequency signals] *sample data* and second bits implementing the Ethernet pipe.

10. A method for providing Ethernet connectivity over a distributed antenna system, the method comprising:

receiving Internet Protocol formatted data from an Internet Protocol device coupled to a remote unit of a distributed antenna system;

[sampling] *generating sample data from* wireless radio frequency signals received at the remote unit [to produce digitized radio frequency samples]; and generating a serial data stream for output to a host unit of the distributed antenna system, the serial data stream further comprising a multiple-timeslot communication frame providing a first set of bits within a timeslot for transporting the [digitized radio frequency samples] *sample data* and a second set of bits within the timeslot for implementing an Ethernet pipe for transporting the Internet Protocol formatted data; wherein generating the serial data stream further comprises multiplexing the [digitized radio frequency signals] *sample data* into the first set of bits within the timeslot of the multiple-timeslot communication frame and multiplexing the IP formatted data into the second set of bits within the timeslot of the multiple-timeslot communication frame.

11. The method of claim 10, wherein generating the serial data stream further comprises:

multiplexing the Internet Protocol data with the [digitized radio frequency samples] *sample data* into timeslots of the multiple-timeslot communication frame.

12. The method of claim 10, wherein receiving Internet Protocol formatted data further comprises receiving the Internet Protocol formatted data via an eight-position eight-contact modular plug.

13. The method of claim 10, wherein generating the serial data stream further comprises:

multiplexing the Internet Protocol formatted data into a second set of timeslots of the multiple-timeslot communication frame, wherein the second set of timeslots do not carry [digitized radio frequency signal data] *the sample data*.

14. The method of claim 10, further comprising:

receiving the serial data stream at the host unit;

de-multiplexing the [digitized radio frequency data] *sample data* and the Internet Protocol formatted data from the serial data stream; and routing the Internet Protocol formatted data to an Ethernet interface at the host unit.

15. The method of claim 10, wherein generating the serial data stream further comprises generating the first set of bits within each timeslot of the multiple-timeslots communication frame for transporting the [digitized radio frequency samples] *sample data* and generating the second set of bits within each timeslot of the multiple-timeslot communication frame for implementing the Ethernet pipe for transporting the Internet Protocol formatted data.

16. A remote unit for a distributed antenna system, the remote unit comprising:

at least one digital to analog radio frequency transceiver module for generating [a digital radio frequency signal] *sample data* from an analog radio frequency signal received from one or more subscriber units;

at least one Internet Protocol device; and a serial radio frequency module coupled to receive the [digital radio frequency signal] *sample data* from the at least one digital to analog radio frequency transceiver module, the serial radio frequency module further comprising an Ethernet interface for communicating Internet Protocol formatted data with the at least one Internet Protocol device;

wherein the serial radio frequency module communicating with a host unit via an upstream serial data stream and a downstream serial data stream;

the upstream serial data stream comprising a multiple-timeslot communication frame having a first set of bits within a timeslot for transporting the [digital radio frequency signal] *sample data* and a second set of bits within the timeslot implementing an Ethernet pipe for transporting upstream Internet Protocol formatted data received via the Ethernet interface; and wherein the serial radio frequency module multiplexes Internet Protocol formatted data received via the Ethernet interface and the [digital radio frequency signal] *sample data* into timeslots of the upstream serial data stream.

17. The remote unit of claim 16, wherein the serial radio frequency module demultiplexes Internet Protocol formatted data from timeslots of the downstream serial data stream and outputs downstream Internet Protocol formatted data to the Ethernet interface.

18. The remote unit of claim 16, wherein the second Ethernet pipe further comprises a timeslot of the multiple-timeslot communication frame that does not carry the [digitized radio frequency signal data] *sample data*.

19. The remote unit of claim 16, wherein the Ethernet interface comprises an eight-position eight-contact modular plug.

20. The remote unit of claim 16, wherein the serial radio frequency module demultiplexes downlink Internet Protocol formatted data and [a] downlink [digital radio frequency signal] *sample data* from timeslots of a downlink serial data stream.

* * * * *